US010010103B2

(12) United States Patent
Soni et al.

(10) Patent No.: US 10,010,103 B2
(45) Date of Patent: Jul. 3, 2018

(54) METHODS FOR THE PRODUCTION AND USE OF MYCELIATED HIGH PROTEIN FOOD COMPOSITIONS

(71) Applicant: Mycotechnology, Inc., Aurora, CO (US)

(72) Inventors: Bhupendra Kumar Soni, Denver, CO (US); Brooks John Kelly, Denver, CO (US); James Patrick Langan, Denver, CO (US); Huntington Davis, Broomfield, CO (US); Alan D. Hahn, Lake Forest, CA (US)

(73) Assignee: Mycotechnology, Inc., Aurora, CO (US)

(*) Notice: Subject to any disclaimer, the term of this patent is extended or adjusted under 35 U.S.C. 154(b) by 0 days.

(21) Appl. No.: 15/488,183

(22) Filed: Apr. 14, 2017

(65) Prior Publication Data
US 2017/0295837 A1 Oct. 19, 2017

Related U.S. Application Data

(60) Provisional application No. 62/322,726, filed on Apr. 14, 2016.

(51) Int. Cl.
A23L 27/20 (2016.01)
A23L 33/105 (2016.01)
A23L 7/104 (2016.01)
A23L 11/00 (2016.01)

(52) U.S. Cl.
CPC ............ A23L 33/105 (2016.08); A23L 7/104 (2016.08); A23L 11/09 (2016.08); A23L 27/20 (2016.08); A23V 2002/00 (2013.01)

(58) Field of Classification Search
CPC ........ A23L 11/09; A23L 27/20; A23L 33/105; A23L 7/104
USPC ............................................. 426/61, 46, 49
See application file for complete search history.

(56) References Cited

U.S. PATENT DOCUMENTS

| 1,822,227 | A | | 9/1931 | Lendrich et al. |
| 2,419,515 | A | | 4/1947 | Wolk |
| 2,451,567 | A | | 10/1948 | Elmer et al. |
| 2,505,811 | A | * | 5/1950 | Szuecs ............ A23L 31/00 426/60 |
| 2,693,664 | A | | 11/1954 | Szuecs |
| 2,693,665 | A | * | 11/1954 | Humfeld ............ A01G 1/04 426/589 |
| 2,761,246 | A | | 9/1956 | Szuecs |
| 2,928,210 | A | | 3/1960 | Cirillo |
| 3,086,320 | A | | 4/1963 | Heinemann |
| 3,701,714 | A | | 10/1972 | Okada et al. |
| 3,749,584 | A | | 7/1973 | Kurtzman et al. |
| 3,810,997 | A | | 5/1974 | Chien |
| 4,071,973 | A | | 2/1978 | Iizuka |
| 4,590,160 | A | | 5/1986 | Nishihashi et al. |
| 4,891,220 | A | | 1/1990 | Donzis et al. |
| 5,934,012 | A | | 8/1999 | Holtz et al. |
| 6,045,834 | A | | 4/2000 | Howes et al. |
| 6,277,396 | B1 | | 8/2001 | Dente |
| 6,476,003 | B1 | | 11/2002 | Jordan et al. |
| 6,490,824 | B1 | | 12/2002 | Maekawa et al. |
| 6,558,943 | B1 | | 5/2003 | Li et al. |
| 6,569,475 | B2 | | 5/2003 | Song et al. |
| 8,535,907 | B2 | | 1/2013 | Tang |
| 8,486,675 | B2 | | 7/2013 | Tang |
| 8,529,981 | B2 | | 9/2013 | Tang |
| 8,623,445 | B2 | | 1/2014 | Tang |
| 8,685,475 | B2 | | 4/2014 | Kwack |
| 8,821,955 | B2 | | 9/2014 | Tang |
| 9,034,402 | B2 | | 5/2015 | Wong |
| 9,068,171 | B2 | * | 6/2015 | Kelly .................... C12N 1/14 |
| 9,427,008 | B2 | | 8/2016 | Kelly et al. |
| 9,480,274 | B2 | | 11/2016 | Tang |
| 9,572,363 | B2 | | 2/2017 | Langan et al. |

(Continued)

FOREIGN PATENT DOCUMENTS

| CN | 102860541 | 1/2013 |
| DE | 4341316 | 6/1995 |

(Continued)

OTHER PUBLICATIONS

Hadar, Y. et al. Appl. Environ. Microbiol. 51: 1352-1354 (1986).*
Tang, Y-J. et al. Enzyme and Microbial Technol. 31: 20-28 (2002).*
Schindler, S. et al. 2012. Food Biotechnol. 26: 58-74 (Abstract).*
Ali (2010) "Production of pyrazine flavours by mycelial fungi," Doctoral Dissertation, University of Pretoria.
Berovic et al. (2003) "Submerged cultivation of Ganoderma lucidum biomass and immunostimulatory effects of fungal polysaccharides," J. Biotechnol. 103(1):77-86.
Beuchat (2001) "13 Indigenous Fermented Foods," Biotechnology. 505-559.
Bok et al. (1999) "Antitumor sterols from the mycelia of Cordyceps sinensis," Phytochemistry. 51:891-898.
Buffo et al. (2004) "Coffee flavour: an overview," Flavour and Fragrance Journal. 19:99-104.

(Continued)

Primary Examiner — Hamid R Badr
(74) Attorney, Agent, or Firm — Leydig, Voit & Mayer, Ltd.

(57) ABSTRACT

Disclosed is a method to prepare a myceliated high-protein food product, which includes culturing a fungi an aqueous media which has a high level of protein, for example at least 20 g protein per 100 g dry weight with excipients, on a dry weight basis. The fungi can include *Pleurotus ostreatus*, *Pleurotus eryngii*, *Lepista nuda*, *Hericium erinaceus*, *Lentinula edodes*, *Agaricus blazeii*, *Laetiporus sulfureus* and combinations thereof. After culturing, the material is harvested by obtaining the myceliated high-protein food product via drying or concentrating. The resultant myceliated high-protein food product may have its taste, flavor, or aroma modulated, such as by increasing desirable flavors or tastes such as meaty, savory, umami, popcorn and/or by decreasing undesirable flavors such as bitterness, astringency or beaniness. Deflavoring and/or deodorizing as compared to non-myceliated control materials can also be observed. Also disclosed are myceliated high-protein food products.

14 Claims, 3 Drawing Sheets

(56) References Cited

U.S. PATENT DOCUMENTS

| Patent/Publication No. | Date | Inventor |
|---|---|---|
| 9,572,364 B2 | 2/2017 | Langan et al. |
| 2002/0082418 A1 | 6/2002 | Ikewaki et al. |
| 2002/0137155 A1 | 9/2002 | Wasser et al. |
| 2003/0208796 A1 | 11/2003 | Song et al. |
| 2004/0009143 A1 | 1/2004 | Golz-Berner et al. |
| 2004/0035047 A1 | 2/2004 | Hwang et al. |
| 2004/0211721 A1 | 10/2004 | Stamets |
| 2005/0180989 A1 | 8/2005 | Matsunaga |
| 2005/0255126 A1 | 11/2005 | Tsubaki et al. |
| 2005/0273875 A1 | 12/2005 | Elias |
| 2006/0014267 A1 | 1/2006 | Cleaver et al. |
| 2006/0134294 A1 | 6/2006 | McKee et al. |
| 2006/0280753 A1 | 12/2006 | McNeary |
| 2007/0160726 A1 | 7/2007 | Fujii et al. |
| 2008/0031892 A1 | 2/2008 | Kristiansen |
| 2008/0057162 A1 | 3/2008 | Brucker et al. |
| 2008/0107783 A1 | 5/2008 | Anijs et al. |
| 2008/0171104 A1 | 7/2008 | Zhu et al. |
| 2008/0193595 A1 | 8/2008 | De Vuyst et al. |
| 2008/0264858 A1 | 10/2008 | Stamets |
| 2008/0274234 A1 | 11/2008 | Miller |
| 2008/0296223 A1 | 12/2008 | Hiromoto |
| 2008/0299645 A1 | 12/2008 | Cleaver et al. |
| 2009/0047236 A1 | 2/2009 | Stamets |
| 2009/0047237 A1 | 2/2009 | Stamets |
| 2009/0053363 A1 | 2/2009 | An |
| 2009/0098244 A1 | 4/2009 | Schatzmayr et al. |
| 2009/0104310 A1 | 4/2009 | Nakajima et al. |
| 2009/0130138 A1 | 5/2009 | Stamets |
| 2009/0220645 A1 | 9/2009 | Martinez et al. |
| 2009/0280212 A1 | 11/2009 | Sugimoto et al. |
| 2010/0005524 A1 | 1/2010 | Blythe et al. |
| 2010/0055241 A1 | 3/2010 | Nakano et al. |
| 2010/0183765 A1 | 7/2010 | Laan Van Der et al. |
| 2010/0203189 A1 | 8/2010 | Holliday |
| 2010/0203194 A1 | 8/2010 | Salminen et al. |
| 2010/0221385 A1 | 9/2010 | Matsui et al. |
| 2010/0239711 A1 | 9/2010 | Li et al. |
| 2010/0266726 A1 | 10/2010 | Ogura et al. |
| 2010/0316763 A1 | 12/2010 | Choi et al. |
| 2011/0008384 A1 | 1/2011 | Stamets |
| 2011/0052758 A1 | 3/2011 | Greiner-Stoeffele et al. |
| 2011/0070332 A1 | 3/2011 | Bernaert et al. |
| 2011/0081448 A1 | 4/2011 | Dunphy et al. |
| 2011/0091579 A1 | 4/2011 | Hausman |
| 2011/0123675 A1 | 5/2011 | Bernaert et al. |
| 2011/0189220 A1 | 8/2011 | Yang et al. |
| 2011/0200551 A1 | 8/2011 | Stamets |
| 2011/0206721 A1 | 8/2011 | Nair |
| 2011/0229616 A1 | 9/2011 | Anijs et al. |
| 2011/0250339 A1 | 10/2011 | Onishi et al. |
| 2011/0262593 A1 | 10/2011 | Binggeli et al. |
| 2011/0268980 A1 | 11/2011 | Kalisz et al. |
| 2012/0017781 A1 | 1/2012 | Ceccarelli |
| 2012/0027889 A1 | 2/2012 | Portella |
| 2012/0028345 A1 | 2/2012 | Ibrahim et al. |
| 2012/0034339 A1 | 2/2012 | Giuliani et al. |
| 2012/0034344 A1 | 2/2012 | Menon et al. |
| 2012/0082754 A1 | 4/2012 | Holliday |
| 2012/0100249 A1 | 4/2012 | Laan Van Der et al. |
| 2012/0128823 A1 | 5/2012 | Camu et al. |
| 2012/0171308 A1 | 7/2012 | Moreira et al. |
| 2012/0177781 A1 | 7/2012 | Hayashi |
| 2012/0190093 A1 | 7/2012 | Fukuda |
| 2012/0231114 A1 | 9/2012 | De Oliveira et al. |
| 2012/0244254 A1 | 9/2012 | Takahashi et al. |
| 2012/0321744 A1 | 12/2012 | Chhun et al. |
| 2013/0209608 A1 | 8/2013 | Berends et al. |
| 2013/0209609 A1 | 8/2013 | Moreno et al. |
| 2013/0337114 A1 | 12/2013 | Binggeli et al. |
| 2014/0065131 A1 | 3/2014 | Kelly et al. |
| 2014/0105928 A1 | 4/2014 | Stamets |
| 2014/0170264 A1 | 6/2014 | Kelly et al. |
| 2014/0302560 A1 | 10/2014 | Kelly |
| 2015/0257405 A1 | 9/2015 | Kelly et al. |
| 2015/0257406 A1 | 9/2015 | Kelly et al. |
| 2015/0272155 A1 | 10/2015 | Kelly et al. |
| 2016/0058049 A1 | 3/2016 | Langan et al. |
| 2016/0120201 A9 | 5/2016 | Kelly et al. |
| 2016/0249660 A1 | 9/2016 | Langan et al. |
| 2017/0156383 A1* | 6/2017 | Langan .................. A23L 27/24 |

FOREIGN PATENT DOCUMENTS

| | | |
|---|---|---|
| EP | 1173544 | 1/2002 |
| EP | 0946106 | 5/2002 |
| EP | 1428440 | 8/2006 |
| EP | 1695631 | 8/2006 |
| EP | 1534088 | 11/2011 |
| EP | 2474221 | 7/2012 |
| EP | 2 166 879 B1 | 10/2014 |
| EP | 2591683 | 1/2017 |
| GB | 2059243 | 4/1981 |
| JP | S59-135840 | 8/1984 |
| JP | S61-219340 | 9/1986 |
| JP | S62-091161 | 4/1987 |
| JP | H11-346657 | 12/1999 |
| JP | 2005-027540 | 2/2005 |
| JP | 4126037 | 7/2008 |
| JP | 2011-103901 | 6/2011 |
| JP | 5037742 | 10/2012 |
| KR | 10-1487724 | 2/2015 |
| NL | 7322 C | 4/1921 |
| WO | WO 2001032830 | 5/2001 |
| WO | WO 2006107208 | 10/2006 |
| WO | WO 2007031186 | 3/2007 |
| WO | WO 2010038867 | 4/2010 |
| WO | WO 2011012680 | 2/2011 |
| WO | WO 2011032244 | 3/2011 |
| WO | WO 2011151831 | 12/2011 |
| WO | WO 2013171194 | 11/2013 |
| WO | 2014/055035 A1 | 4/2014 |
| WO | WO 2014145256 | 9/2014 |
| WO | WO 2014145265 | 9/2014 |
| WO | WO 2016033241 | 3/2016 |
| WO | WO 2016138476 | 9/2016 |

OTHER PUBLICATIONS

Chang et al. (2002) "Bioactive Polysaccharides from Traditional Chinese Medicine Herbs as Anticancer Adjuvants," The Journal of Alternative and Complementary Medicine. 8(5):559-565.

Chang et al. (2009) "Gandoderma lucidum Extract Promotes Immune Responses in Normal BALB/c Mice In Vivo," In Vivo. 23:755-760.

Crafack et al. (2013) "Influencing cocoa flavour using Pichia Kluyveri and Kluyveromyces marxianus in a defined mixed starter culture for cocoa fermentation," International Journal of Food Microbiology. 167:103-116.

De Melo et al. (2009) "Influence of Flammulina velutipes mycelia culture conditions on antimicrobial metabolite production," Mycoscience. 50(1):78-81.

Diekman (Sep. 2012) "Sweeteners Facts and Fallacies: Learn the Truth about the Different Types of Sweeteners to Better Counsel Patients," Today's Dietitian. 14(9):42-45.

Emden (2015) "Decaffeination 101: Four Ways to Decaffeinate Coffee," Coffee Connection. Available on the Internet at URL: http://www.coffeeconfidential.orglhealth/decaffeination/ [last accessed Jan. 29, 2015].

Encyclopedia Britannica (2014) Louis Pasteur, Datasheet. Available on the Internet at URL: http://www.britannica.com/Ebchecked/topic/445964/Louis-Pasteur [last accessed Feb. 6, 2014].

European Search Report corresponding to European Patent Application No. 14763975.1, dated Sep. 14, 2016.

European Search Report corresponding to European Patent Application No. 14765389.3, dated Nov. 17, 2016.

Fan et al. (2000) "Use of various coffee industry residues for the cultivation of Pleurotus ostreatus in solid state fermentation," Acat Biotechnol. 20(1):41-52.

Firenzuoli et al. (2008) "The Medicinal Mushroom *Agaricus blazei* Murrill: Review of Literature and Pharmaco-Toxicological Problems," Evid. Based Complement Alternat. Med. 5(1):3-15.

(56) References Cited

OTHER PUBLICATIONS

Foster (2014) "What is Mycelium?" Conjecture Corporation. Available on the Internet at URL: http://www.wisegeek.org/what-is-mycelium.htm [last accessed Jul. 28, 2014].
Han (2005) "Solid-state fermentation of cornmeal with the basidiomycete Ganoderma lucidum for degrading starch and upgrading nutritional value," J. Appl. Micro. 99:910-915.
Hashim (1997) "Effect of Processing on Flavour Precursors, Pyrazines and Flavour Quality of Malaysian Cocoa Beans," PhD Thesis, Universiti Putra Malaysia.
He et al. (2010) "Patented Techniques for Detoxification of Mycotoxins in Feeds and Food Matrices," Recent Patents on Food, Nutrition & Agriculture. 2:96-104.
Ikrawan (2003) "Influence of Carboxypeptidases on Cocoa Specific Aroma Precursors and Methylpyrazines in Under-Fermented Cocoa Beans," PhD Thesis, Universiti Putra Malaysia.
International Preliminary Report on Patentability corresponding to International Patent Application No. PCT/US2014/029989, dated Sep. 15, 2015.
International Preliminary Report on Patentability corresponding to International Patent Application No. PCT/US2014/029998, dated Sep. 15, 2015.
International Search Report and the Written Opinion corresponding to International Patent Application No. PCT/US14/29989, dated Aug. 12, 2014.
International Search Report and the Written Opinion corresponding to International Patent Application No. PCT/US14/29998, dated Sep. 11, 2014.
International Search Report and the Written Opinion corresponding to International Patent Application No. PCT/US2015/047036 dated Jan. 29, 2016.
International Search Report and the Written Opinion corresponding to International Patent Application No. PCT/US2016/019929, dated May 19, 2016.
Ishikawa et al. (2001) "Antimicrobial Cuparene-Type Sesquiterpenes, Enokipodins C and D, from a Mycelial Culture of Flammulina velutipes," J. Nat. Prod. 64(7):932-934.
Japanese Office Action corresponding to Japanese Patent Application No. 2016503300, dated Sep. 21, 2016.
Japanese Office Action corresponding to Japanese Patent Application No. 2016503304, dated Sep. 30, 2016.
Kamimura (1989) "Removal of Mycotoxins during Food Processing," Tokyo Metropolitan Research Laboratory of Public Health. 88-94.
Kang (2003) "Studies on chemical constituents of the mycelia from fermented culture of Flammulina velutipes," Zhongguo Zhong Yao Za Zhi. 28(11):1038-1040. [Abstract].
Kang (2005) "Studies on chemical constituents in the mycelia from fermented culture of Flarnmulina velutipes," Zhongguo Zhong Yao Za Zhi. 30(30):193-195. [Abstract].
Konno et al. (2002) "Anticancer and hypoglycemic effects of polysaccharides in edible and medicinal Maitake mushroom [*Grifola frondosa* (Dicks.: Fr.) SF Gray]," International Journal of Medicinal Mushrooms. 4(3):10-21.
Kuo et al. (1996) "Cordyceps sinensis as an Immunomodulatory Agent," Am. J. Chin. Med. 24:111-125.
Lakshmi et al. (2003) "Antiperoxidative, anti-inflammatory, and antimutagenic activities of ethanol extract of the mycelium of Ganoderma lucidum occurring in South India," Teratog. Carcinog. Mutagen. 1:85-97. [Abstract].
Lee et al. (2003) "Biological activities of the polysaccharides produced from submerged culture of the edible Basidiomycete Grifolafrondosa," Enzyme and Microbial Technology. 32(5):574-581.
Lefeber et al. (2012) "On-farm implementation of a starter culture for improved cocoa bean fermentation and its influence on the flavour of chocolates produced thereof," Food Microbiology. 30:379-392.
Liu et al. (2012) "Improving the Fermentation Production of the Individual Key Triterpene Ganoderic Acid Me by the Medicinal Fungus *Ganodenna lucidum* in Submerged Culture," Molecules. 17:12575-12586.
McMahon (2014) "How Can I Make Tempeh?" Conjecture Corporation. Available on the Internet at URL: http://www.wisegeek.com/how-can-i-make-tempeh.htm [last accessed Jul. 28, 2014].
MedlinePlus (2014) "Medical Dictionary Datasheet: Autoclave," Merriam-Webster, Inc. Available on the Internet at URL: http://www.merriam-webster.com/medlineplus/autoclave [last accessed Feb. 7, 2014].
MicrobiologyBytes (2009) "Introduction to Mycology," Microbiology Notes Datasheet. Available on the Internet at URL: http://www.microbiologybytes.com/introduction/myc1.html [last accessed Feb. 6, 2014].
Mind Media (2014) "Eating mycelium to trip," Shroomery. Available on the Internet at URL: https://www.shroomery.org/forums/showflat.php/Number/1197948 [last accessed Jul. 28, 2014].
Mind Media (Oct. 12, 2006) "Liquid Culture Basics," Shroomery. Available on the Internet at URL: https://www.shroomery.org/9145 [last accessed Jun. 12, 2017].
Morris et al. (2003) "Immunomodulating Effects of Hot-Water Extract From Pleurotus Ostreatus Mycelium on Cyclophosphamide Treated Mice," Micologia Aplicada Internacional. 15(1):7-13. [Abstract].
Mycotopia (2014) "Eat Mycelium cakes?" Mycotopia Community Software. Available on the Internet at URL: https://mycotopia.net/topic/9526-eat-mycelium-cakes/ [last accessed Jul. 28, 2014].
NameBright "Technique Sheet: Culture Media for Fungi," Available on the Internet at URL: www.centralpamushroomclub.org/sites/default/files/culture.pdf 141966 [last accessed Feb. 12, 2015].
Non-Final Rejection corresponding to U.S. Appl. No. 13/844,685, dated Feb. 19, 2014.
Nowrousian et al. (2007) "The novel ER membrane protein PRO41 is essential for sexual development in the filamentous fungus *Sordaria macrospora*," Molecular Microbiology. 64(4):923-937.
Ogundero (1983) "Thermophilic fungi and fermenting cacao beans in Nigeria," Mycopathologia. 82:159-165.
Paterson (2006) "Ganoderma—A therapeutic fungal biofactory," Phytochemistry. 67:1985-2001.
Schwan (2004) "The Microbiology of Cocoa Fermentation and its Role in Chocolate Quality," Critical Reviews in Food Science and Nutrition. 44:205-221.
Schwan (Apr. 1998) "Cocoa Fermentations Conducted with a Defined Microbial Cocktail Inoculum," Applied and Environmental Microbiology. 64(4)1477-1483.
Shao et al. (2001) "Determination of nucleosides in natural Cordyceps sinensis and cultured Cordyceps mycelia by capillary electrophoresis," Electrophoresis. 22(1):144-150.
Simple Machines (2014) "Eat Mycelium?" FungiFun. Available on the Internet at URL: http://www.fungifun.org/forum/index.php?topic=913.0 [last accessed Jul. 28, 2014].
Sone et al. (1985) "Structures and Antitumor Activities of the Polysaccharides Isolated from Fruiting Body and the Growing Culture of Mycelium of Ganoderma lucidum," Agric. Biol. Chem. 49(9):2641-2653.
Song et al. (2002) "Antioxidant properties of Antrodia camphorata in submerged culture," Journal of Agricultural Food Chemistry. 50:3322-3327.
Stamets (2003) "Culturing Mushroom Mycelium on Agar Media," Growing Gourmet and Medicinal Mushrooms. 89-92.
Taylor (2001) "Measuring Fungal Growth," Microorganisms and Biotechnology. Chapter 3.8, p. 44.
Tsubouchi et al. (1987) "Effect of roasting on ochratoxin A level in green coffee beans inoculated with Aspergillus ochraceus," Mycopathologia. 97:111-115.
Ulziijargal et al. (2011) "Nutrient Compositions of Culinary-Medicinal Mushroom Fruiting Bodies and Mycelia," Int. J. Med. Mushrooms. 13(4):343-349.
Wasser (2002) "Medicinal mushrooms as a source of antitumor and immunomodulating polysaccharides," Appl Microbial Biotechnol. 60:258-274.

(56) References Cited

OTHER PUBLICATIONS

WikiAnswers (2014) "Can You Eat Mycelium?" Answers. Available on the Internet at URL: http://www.answers.com/Q/Can_you_eat_mycelium [last accessed Jul. 28, 2014].

Willis et al. (2010) "Effect of Dietary Fungus Myceliated Grain on Broiler Performance and Enteric Colonization with Bifidobacteria and *Salmonella*," International Journal of Poultry Science. 9(1):48-52.

wiseGEEK (2014) "Eating Mycelium," Conjecture Corporation. Available on the Internet at URL: http://topics.wisegeek.org/topics.htm?eating-mycelium# [last accessed Jul. 28, 2014].

Wu et al. (2011) "Ling Zhi-8 mediates p53-dependent growth arrest of lung cancer cells proliferation via the ribosomal protein S7-MDM2-p53 pathway," Carcinogenesis. 32(12):1890-1896.

Yin et al. (2010) "Purification, Characterization and Immuno-Modulating Properties of Polysaccharides Isolated from Flammulina velutipes Mycelium," Am. J. Chin. Med. 38(1):191-204.

Zhang et al. (2004) "Induction of HL-60 apoptosis by ethyl acetate of Cordyceps sinensis fungal mycelium," Life Sciences. 75:2911-2919.

Zhang et al. (2010) "Mycelial growth and polysaccharide content of Polyporus umbellatus," Journal of Medicinal Plants Research. 4(18):1847-1852.

Zhong et al. (2004) "Submerged Cultivation of Medicinal Mushrooms for Production of Valuable Bioactive Metabolites," Adv Biochem Engin Biotechnol. 87:25-59.

Zhou et al. (2009) "Cordyceps fungi: natural products, pharmacological functions and developmental products," Journal of Pharmacy and Pharmacology. 61:279-291.

Zoklet "Eating Mycelium?" (2014) Jelsoft Enterprises Ltd. Available on the Internet at URL: http://www.zoklet.net/bbs/showthread.php?t=141966 [last accessed Jul. 28, 2014].

Jonathan et al. (2011) "Evaluation of Ten Wild Nigerian Mushrooms for Amylase and Cellulase Activities," Mycobiol. 39(2):103-108.

Thammawat et al. (2008) "Isolation, Preliminary Enzyme Characterization and Optimization of Culture Parameters for Production of Naringinase Isolated from Aspergillus niger BCC 25166," Kasetsart J. (Nat. Sci.) 42:61-72.

International Search Report with Written Opinion corresponding to International Patent Application No. PCT/US2017/027731, dated Jul. 19, 2017.

Nagai et al. (2006) "Characterization of honey from different floral sources. Its functional properties and effects of honey species on storage of meat," Food Chemistry. 97:256-262.

* cited by examiner

METHODS FOR THE PRODUCTION AND USE OF MYCELIATED HIGH PROTEIN FOOD COMPOSITIONS

CROSS-REFERENCE TO RELATED APPLICATIONS

This application claims the benefit of U.S. Provisional Application No. 62/322,726, filed Apr. 14, 2016, entitled "Methods for the production and use of Myceliated High Protein Food Compositions", the disclosure of each of which is hereby incorporated by reference herein in its entirety.

BACKGROUND OF INVENTION

There is a growing need for efficient, high quality and low cost high-protein food sources with acceptable taste, flavor and/or aroma profiles. However, it has proven difficult to achieve such products, particularly with low cost vegetarian protein sources.

Previous work discloses culturing of fungi using low amounts of protein in the culture media. U.S. Pat. No. 2,693,665 discusses the submerged culturing of *Agaricus campestris* grown in citrus juice, pear juice, asparagus juice, "organic material", a carbohydrate, a nitrogen source, and any combination of these materials optionally supplemented with urea and/or various ammonium salts.

U.S. Pat. No. 2,761,246 teaches a method for the production of submerged *Morchella esculenta*, and more broadly Helvellaceae mycelium for the purposes of creating a human foodstuff. The publication discusses the use of various molasses solutions as media supplemented with ammonium salts and the inclusion of calcium carbonate or calcium sulfate as nucleation sites for hyphal spheres to increase biomass yield 30 fold. In general, the patent teaches the art of growing submerged mycelium on a carbohydrate source "such as many of the monosaccharides, or some of the disaccharides or their hydrolysates" and a nitrogen source "such as ammonium salts or amino acids or any kind of protein hydrolysate". The culture propagation motif includes three separate cultures and an intermittent filtering step.

U.S. Pat. No. 2,928,210 discloses a method to produce mushroom mycelium from sulfite liquor waste supplemented with organic and inorganic salts, presenting the idea as an efficient way to prevent sulfite liquor pollution. Culture propagation does require that the mycelium be washed to remove residual liquor, taught as a necessary step to make the product human food grade. This introduces the disadvantage of washing away exocellular solids that would otherwise greatly contribute to yield. This also introduces a new waste stream that will presents the same problems the publication is trying to solve.

U.S. Pat. No. 3,086,320 discloses a method to improve the flavor of submerged mycelium of *M. 'esculema', Helvella gigas, Coprinus comatus,* and *A. campestris* by growing the strains in a media comprising milk. The patent claims the major issue of edible mycelium is that "the mycelium, while similar in flavor to the natural sporophore, falls short in matching it in intensity and kind." The patent teaches the use of 1 to 50% (v/v) natural skim milk to media, or 0.33 to 16.66% condensed natural skim milk with nonfat dry milk solids in an amount of about 0.03 to 1.66% (w/w) to the condensed natural skim milk if the condensed milk is being substituted for the non-condensed. If using natural skim milk, milk protein hydrolysate can be used in an amount of about 5% (w/w). The patent recommends using skim milk in an amount between 5-10% (v/v) to media. Mycelium flavor is said to improve with higher concentrations of milk.

U.S. Pat. No. 4,071,973 discloses culturing conditions for Basidiomycetes. The patent teaches to inoculate media with "a body of a fungus" and supply "inorganic nutrient salts for nitrogen, phosphate and potassium," mixed with sucrose at 50-70 g/L and supplemented with fine powder of "crushed sugarcane, sugarcane bagasse, pine tree-tissue and wheat bran" at 0.2-15 g/L. Oxygen is controlled at 30-90% (v/v) to the media and the vessel is pressurized at 0.12-0.5 MPa (17.4 to 72.5 psi) with oxygen supplied at 0.1 to 1.0 L/minute. Salts used include ammonium nitrate, sodium phosphate, magnesium sulfate heptahydrate, iron (II) sulfate heptahydrate and dipotassium hydrogen phosphate. Air pressure cycles are controlled with a pressure regulator. The patent states that cell growth enhancement through elevated oxygen levels is unexpected.

There is therefore a need for efficient, high quality and low cost high-protein food sources with acceptable taste, flavor and/or aroma profiles, and for a process that enables the myceliation of highly proteinaceous media, specifically media that are greater than 50% protein on a dry weight basis.

SUMMARY OF THE INVENTION

The present inventors have found that culturing a fungus in a high protein media provides an economically viable product, and also found that such treatment can also alter the taste, flavor or aroma of high protein food compositions in unexpected ways. The process additionally enables the production of protein concentrates, isolates and high protein foodstuffs that have been imbued with mycelial material, thereby altering aspects of the media used in the production of products according to the methods of the present invention. The present invention also presents the ability to stack protein sources to optimize amino acid profiles of products made according to the methods of the invention.

Thus, the present invention includes methods to prepare a myceliated high-protein food product by culturing a fungus in an aqueous media which includes a high-protein material, with amounts of protein of at least 20 g protein per 100 g total dry weight with excipients, resulting in a myceliated high-protein food product, whereby the flavor or taste of the myceliated high-protein food product is modulated compared to the high-protein material.

Appropriate fungi to use in the methods of the include, for example, *Pleurotus ostreatus, Pleurotus eryngii, Lepista nuda, Hericium erinaceus, Lentinula edodes, Agaricus blazeii, Laetiporus sulfureus* and combinations thereof.

The amounts of protein in the aqueous media can be between 10 g/L protein and 500 g/L protein. The aqueous media may include a high-protein material which is a protein concentrate or a protein isolate from a vegetarian or non-vegetarian source. The vegetarian source may include pea, rice, soy, cyanobacteria, grain, hemp, or combinations of these.

The produced myceliated high-protein food product may be pasteurized, sterilized, dried, powderized. The produced myceliated high-protein food product may have its flavors, tastes, and/or aromas enhanced, such as by increasing meaty flavors, enhancing umami taste, enhancing savory flavors, enhancing popcorn flavors, or enhancing mushroom flavors in the myceliated high-protein food product; or, the produced high-protein food product may have its flavors, tastes and/or aromas decreased, resulting in milder aromas or tastes, or reduced bitter, astringent, beany flavors, tastes, or aromas.

The present invention also includes a myceliated high-protein food product made by, for example, the processes of the invention. The myceliated high-protein food product may be at least 20% protein, may be produced from a vegetarian source such as pea or rice, and may have enhanced desirable flavors and/or decreased undesirable Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
FIG. 1. A 10× photomicrograph of a media containing rice and pea protein prior to inoculation by mycelial culture.
Figure 1:
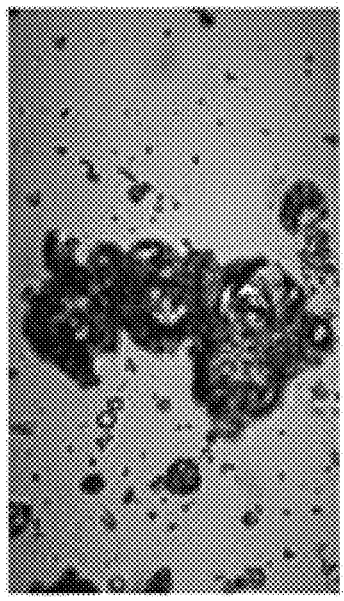

In general, the terms and phrases used herein have their art-recognized meaning, which can be found by reference to standard texts, journal references and contexts known to those skilled in the art. The following definitions are provided to clarify their specific use in the context of the invention.

In one embodiment, the present invention includes a method to prepare a myceliated high-protein food product. The method may optionally include the steps of providing an aqueous media comprising a high-protein material. The aqueous media may comprise, consist of, or consist essentially of at least 20 g protein per 100 g total excipients, on a dry weight basis. The media may also comprise, consist of or consist essentially of optional additional excipients as identified hereinbelow. The aqueous media may be inoculated with a fungal culture. The inoculated media may then be cultured to produce a myceliated high-protein food product, and the myceliated high-protein food product taste, flavor, and/or aroma may be modulated compared to the high-protein material in the absence of the culturing step.

The aqueous media may comprise, consist of, or consist essentially of a high-protein material. The high-protein material to include in the aqueous media can be obtained from a number of sources, including vegetarian sources as well as non-vegetarian sources, and can include a protein concentrate and/or isolate. Vegetarian sources include meal, protein concentrates and isolates prepared from a vegetarian source such as pea, rice, chick pea, soy, cyanobacteria, hemp and other sources, or a combination thereof. For example, cyanobacteria containing more than 50% protein can also be used a source of high-protein material. Typically, a protein concentrate is made by removing the oil and most of the soluble sugars from a meal, such as soybean meal. Such a protein concentrate may still contain a significant portion of non-protein material, such as fiber. Typically, protein concentrations in such products are between 55-90%. The process for production of a protein isolate typically removes most of the non-protein material such as fiber and may contain up to about 90-99% protein. A typical protein isolate is typically subsequently dried and is available in a powdered form and may alternatively be called "protein powder."

Non-vegetarian sources for the high-protein material may also be used in the present invention. Such non-vegetarian sources include whey, casein, egg, meat (beef, chicken, pork sources, for example), isolates, concentrates, broths, or powders. However, in some embodiments vegetarian sources have certain advantages over non-vegetarian sources. For example, whey or casein protein isolates generally contain some amount of lactose and which can cause difficulties for those who are lactose-intolerant. Egg protein isolates may cause problems to those who are allergic to eggs and are is also quite expensive. Certain vegetable sources have disadvantages as well, while soy protein isolates have good Protein Digestibility Corrected Amino Acid Scores (PDCAAS) and digestible indispensable amino acid scores (DIAAS) scores, and is inexpensive, soy may be allergenic and has some consumer resistance due to concerns over phytoestrogens and taste. Rice protein is highly digestible, but is deficient in some amino acids such as lysine. Rice protein is therefore not a complete protein and further many people perceive rice protein to have an off-putting taste and aroma. Pea protein is generally considered to contain all essential amino acids, is not balanced and thus is not complete and many people perceive pea protein to have an off-putting aroma. Hemp protein is a complete protein with decent taste and aroma, but is expensive.

In one embodiment, mixtures of any of the high-protein materials disclosed can be used to provide, for example, favorable qualities, such as a more complete (in terms of amino acid composition) high-protein material. In one embodiment, high-protein materials such as pea protein and rice protein can be combined. In one embodiment, the ratio of a mixture can be from 1:10 to 10:1 pea protein:rice protein (on a dry basis). In one embodiment, the ratios can optionally be 5:1 to 1:5, 2:1 to 1:2, or in one embodiment, 1:1.

The high-protein material itself can be about 20% protein, 30% protein, 40% protein, 45% protein, 50% protein, 55% protein, 60% protein, 65% protein, 70% protein, 75% protein, 80% protein, 85% protein, 90% protein, 95% protein, or 98% protein, or at least about 20% protein, at least about 30% protein, at least about 40% protein, at least about 45% protein, at least about 50% protein, at least about 55% protein, at least about 60% protein, at least about 65% protein, at least about 70% protein, at least about 75% protein, at least about 80% protein, at least about 85% protein, at least about 90% protein, at least about 95% protein, or at least about 98% protein.

This invention discloses the use of concentrated media, which provides, for example, an economically viable economic process for production of an acceptably tasting and/or flavored high-protein food product. In one embodiment of the invention the total media concentration is up to 150 g/L but can also be performed at lower levels, such as 5 g/L. Higher concentrations in media result in a thicker and/or more viscous media, and therefore are optionally processed by methods known in the art to avoid engineering issues during culturing or fermentation. To maximize economic benefits, a greater amount of high-protein material per L media is used. The amount is used is chosen to maximize the amount of high-protein material that is cultured, while minimizing technical difficulties in processing that may arise during culturing such as viscosity, foaming and the like. The amount to use can be determined by one of skill in the art, and will vary depending on the method of fermentation The amount of total protein in the aqueous media may comprise, consist of, or consist essentially of at least 20 g, 25 g, 30 g, 35 g, 40 g, 45 g, 50 g, 55 g, 60 g, 65 g, 70 g, 75 g, 80 g, 85 g, 90 g, 95 g, or 100 g, or more, of protein per 100 g total dry weight with excipients, or per total all components on a dry weight basis. Alternatively, the amount of protein comprise, consist of, or consist essentially of between 20 g to 90 g, between 30 g and 80 g, between 40 g and 70 g, between 50 g and 60 g, of protein per 100 g dry weight with excipients.

In some embodiments, the total protein in aqueous media is about 45 g to about 100 g, or about 80-100 g of protein per 100 g dry weight with excipients.

In another embodiment, the aqueous media comprises between about 1 g/L and 200 g/L, between about 5 g/L and 180 g/L, between about 20 g/L and 150 g/L, between about 25 g/L and about 140 g/L, between about 30 g/L and about 130 g/L, between about 35 g/L and about 120 g/L, between about 40 g/L and about 110 g/L, between about 45 g/L and about 105 g/L, between about 50 g/L and about 100 g/L, between about 55 g/L and about 90 g/L, or about 75 g/L protein; or between about 50 g/L-150 g/L, or about 75 g/L and about 120 g/L, or about 85 g/L and about 100 g/L. Alternatively, the aqueous media comprises at least about 10 g/L, at least about 15 g/L, at least about 20 g/L, at least about 25 g/L, at least about 30 g/L, at least about 35 g/L, at least about 40 g/L or at least about 45 g/L protein. In fermenters, in some embodiments the amount to use includes between about 1 g/L and 150 g/L, between about 10 g/L and 140 g/L, between about 20 g/L and 130 g/L, between about 30 g/L and about 120 g/L, between about 40 g/L and about 110 g/L, between about 50 g/L and about 100 g/L, between about 60 g/L and about 90 g/L, between about 70 g/L and about 80 g/L, or at least about 20 g/L, at least about 30 g/L, at least about 40 g/L, at least about 50 g/L, at least about 60 g/L, at least about 70 g/L, at least about 80 g/L, at least about 90 g/L, at least about 100 g/L, at least about 110 g/L, at least about 120 g/L, at least about 130 g/L or at least about 140 g/L.

In some embodiments, the aqueous media comprises between about 50 g/L and about 100 g/L, or about 80 g/L, about 85 g/L, about 90 g/L, about 95 g/L about 100 g/L, about 110 g/L, about 120 g/L, about 130 g/L, about 140 g/L, or about 150 g/L.

It can be appreciated that in calculating such percentages, the percentage of protein in the high-protein material must accounted for. For example, if the amount of high-protein material is 10 g, and the high-protein material is 80% protein, then the protein source includes 8 g protein and 2 non-protein material. When added to 10 g of excipients to create 20 total grams dry weight with excipients, then the total is 8 g protein per 20 g total excipients, or 40% protein, or 40 g protein per 100 g total protein plus excipients. If a protein-containing excipient such as yeast extract or peptone is added to the media, the amount of protein per g total weight plus excipients will be slightly higher, taking into account the percentage of protein and the amount added of the protein-containing excipient, and performing the calculation as discussed herein, as is known in the art.

In some embodiments, the high-protein material, after preparing the aqueous media of the invention, is not completely dissolved in the aqueous media. Instead, the high-protein material may be partially dissolved, and/or partially suspended, and/or partially colloidal. However, even in the absence of complete dissolution of the high-protein material, positive changes may be affected during culturing of the high-protein material. In one embodiment, the high-protein material in the aqueous media is kept as homogenous as possible during culturing, such as by ensuring agitation and/or shaking.

In one embodiment, the aqueous media further comprises, consists of, or consists essentially of materials other than the high-protein material, e.g., excipients as defined herein and/or in particular embodiments. Excipients can comprise any other components known in the art to potentiate and/or support fungal growth, and can include, for example, nutrients, such as proteins/peptides, amino acids as known in the art and extracts, such as malt extracts, meat broths, peptones, yeast extracts and the like; energy sources known in the art, such as carbohydrates; essential metals and minerals as known in the art, which includes, for example, calcium, magnesium, iron, trace metals, phosphates, sulphates; buffering agents as known in the art, such as phosphates, acetates, and optionally pH indicators (phenol red, for example). Excipients may include carbohydrates and/or sources of carbohydrates added to media at 5-10 g/L. It is usual to add pH indicators to such formulations.

Excipients may also include peptones/proteins/peptides, as is known in the art. These are usually added as a mixture of protein hydrolysate (peptone) and meat infusion, however, as used in the art, these ingredients are typically included at levels that result in much lower levels of protein in the media than is disclosed herein. Many media have, for example, between 1% and 5% peptone content, and between 0.1 and 5% yeast extract and the like.

In one embodiment, excipients include for example, yeast extract, malt extract, maltodextrin, peptones, and salts such as diammonium phosphate and magnesium sulfate, as well as other defined and undefined components such as potato or carrot powder. In some embodiments, organic (as determined according to the specification put forth by the National Organic Program as penned by the USDA) forms of these components may be used.

In one embodiment, excipients comprise, consist of, or consist essentially of dry carrot powder, dry malt extract, diammonium phosphate, magnesium sulfate, and citric acid. In one embodiment, excipients comprise, consist of, or consist essentially of dry carrot powder between 0.1-10 g/L, dry malt extract between 0.1 and 20 g/L, diammonium phosphate between 0.1 and 10 g/L, and magnesium sulfate between 0.1 and 10 g/L. Excipients may also optionally comprise, consist of, or consist essentially of citric acid and an anti-foam component.

The method may also comprise the optional step of sterilizing the aqueous media prior to inoculation by methods known in the art, including steam sterilization and all other known methods to allow for sterile procedure to be followed throughout the inoculation and culturing steps to enable culturing and myceliation by pure fungal strains. Alternatively, the components of the media may be separately sterilized and the media may be prepared according to sterile procedure.

The method also includes inoculating the media with a fungal culture. The fungal culture may be prepared by culturing by any methods known in the art. In one embodiment, the methods to culture may be found in, e.g., PCT/US14/29989, filed Mar. 15, 2014, PCT/US14/29998, filed Mar. 15, 2014, all of which are incorporated by reference herein in their entireties.

The fungal cultures, prior to the inoculation step, may be propagated and maintained as is known in the art. In one embodiment, the fungi discussed herein can be kept on 2-3%

(v/v) mango puree with 3-4% agar (m/v). Such media is typically prepared in 21.6 L handled glass jars being filled with 1.4-1.5 L media. Such a container pours for 50-60 90 mm Petri plates. The media is first sterilized by methods known in the art, typically with an autoclave. Conventional *B. stearothermophilus* and thermocouple methods are used to verify sterilization parameters. Some strains, such as *L. sulfureus*, grow better when supplemented with 1% yellow cornmeal. Agar media can also be composed of high-protein material to sensitize the strain to the final culture. This technique may also be involved in strain selection of the organisms discussed herein. Agar media should be poured when it has cooled to the point where it can be touched by hand (~40-50° C.).

In one embodiment, maintaining and propagating fungi for use for inoculating the high-protein material as disclosed in the present invention may be carried out as follows. For example, a propagation scheme that can be used to continuously produce material according to the methods is discussed herein. Once inoculated with master culture and subsequently colonized, Petri plate cultures can be used at any point to propagate mycelium into prepared liquid media. As such, plates can be propagated at any point during log phase or stationary phase but are encouraged to be used within three months and in another embodiment within 2 years, though if properly handled by those skilled in the art can generally be stored for as long as 10 years at 4° C. and up to 6 years at room temperature.

In some embodiments, liquid cultures used to maintain and propagate fungi for use for inoculating the high-protein material as disclosed in the present invention include undefined agricultural media with optional supplements as a motif to prepare culture for the purposes of inoculating solid-state material or larger volumes of liquid. In some embodiments, liquid media preparations are made as disclosed herein. Liquid media can be also sterilized and cooled similarly to agar media. Like agar media it can theoretically be inoculated with any fungal culture so long as it is deliberate and not contaminated with any undesirable organisms (fungi inoculated with diazotrophs may be desirable for the method of the present invention). As such, liquid media are typically inoculated with agar, liquid and other forms of culture. Bioreactors provide the ability to monitor and control aeration, foam, temperature, and pH and other parameters of the culture and as such enables shorter myceliation times and the opportunity to make more concentrated media.

In one embodiment, the fungi for use for inoculating the high-protein material as disclosed in the present invention may be prepared as a submerged liquid culture and agitated on a shaker table, or may be prepared in a shaker flask, by methods known in the art and according to media recipes disclosed in the present invention. The fungal component for use in inoculating the aqueous media of the present invention may be made by any method known in the art. In one embodiment, the fungal component may be prepared from a glycerol stock, by a simple propagation motif of Petri plate culture to 0.5-4 L Erlenmeyer shake flask to 50% glycerol stock. Petri plates can comprise agar in 10-35 g/L in addition to various media components. Conducted in sterile operation, chosen Petri plates growing anywhere from 1-~3,652 days can be propagated into 0.5-4 L Erlenmeyer flasks (or 250 to 1,000 mL Wheaton jars, or any suitable glassware) for incubation on a shaker table or stationary incubation. The smaller the container, the faster the shaker should be. In one embodiment, the shaking is anywhere from 40-160 RPM depending on container size and, with about a I" swing radius.

The culturing step of the present invention may be performed by methods (such as sterile procedure) known in the art and disclosed herein and may be carried out in a fermenter, shake flask, bioreactor, or other methods. In a shake flask, in one embodiment, the agitation rate is 50 to 240 RPM, or 85 to 95 RPM, and incubated for 1 to 90 days. In another embodiment the incubation temperature is 70-90° F. In another embodiment the incubation temperature is 87-89° F. Liquid-state fermentation agitation and swirling techniques as known in the art are also employed which include mechanical shearing using magnetic stir bars, stainless steel impellers, injection of sterile high-pressure air, the use of shaker tables and other methods such as lighting regimen, batch feeding or chemostatic culturing, as known in the art.

In one embodiment, culturing step is carried out in a bioreactor which is ideally constructed with a torispherical dome, cylindrical body, and spherical cap base, jacketed about the body, equipped with a magnetic drive mixer, and ports to provide access for equipment comprising DO, pH, temperature, level and conductivity meters as is known in the art. Any vessel capable of executing the methods of the present invention may be used. In another embodiment the set-up provides 0.1-5.0 ACH. Other engineering schemes known to those skilled in the art may also be used.

The reactor can be outfitted to be filled with water. The water supply system is ideally water for injection (WFI) system, with a sterilizable line between the still and the reactor, though RO or any potable water source may be used so long as the water is sterile. In one embodiment the entire media is sterilized in situ while in another embodiment concentrated media is sterilized and diluted into a vessel filled water that was filter and/or heat sterilized, or sufficiently treated so that it doesn't encourage contamination over the colonizing fungus. In another embodiment, high temperature high pressure sterilizations are fast enough to be not detrimental to the media. In one embodiment the entire media is sterilized in continuous mode by applying high temperature between 130° and 150° C. for a residence time of 1 to 15 minutes. Once prepared with a working volume of sterile media, the tank can be mildly agitated and inoculated. Either as a concentrate or whole media volume in situ, the media can be heat sterilized by steaming either the jacket, chamber or both while the media is optionally agitated. The medium may optionally be pasteurized instead.

In one embodiment, the reactor is used at a large volume, such as in 500,000-200,000 L working volume bioreactors. When preparing material at such volumes the culture must pass through a successive series of larger bioreactors, any bioreactor being inoculated at 0.5-15% of the working volume according to the parameters of the seed train. A typical process would pass a culture from master culture, to Petri plates, to flasks, to seed bioreactors to the final main bioreactor when scaling the method of the present invention. To reach large volumes, 3-4 seeds may be used. The media of the seed can be the same or different as the media in the main. In one embodiment, the fungal culture for the seed is a protein concentration as defined herein, to assist the fungal culture in adapting to high-protein media in preparation for the main fermentation. Such techniques are discussed somewhat in the examples below. In one embodiment, foaming is minimized by use of antifoam on the order of 0.5 to 2.5 g/L of media, such as those known in the art, including insoluble oils, polydimethylsiloxanes and other silicones, certain alcohols, stearates and glycols. In one embodiment, lowering pH assists in culture growth, for example, for *L. edodes* pH may be adjusted by use of citric acid or by any other compound known in the art, but care must be taken to avoid a sour taste for the myceliated high-protein product. The pH may be adjusted to between about 4.5 and 5.5, for example, to assist in growth.

Figure 2:
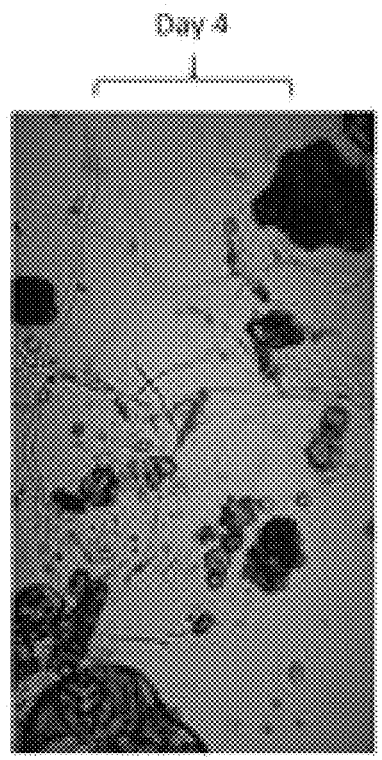
FIG. 2. A 10× photomicrograph of a mycelial culture at Day 4 grown in media containing rice and pea protein.
Figure 2:
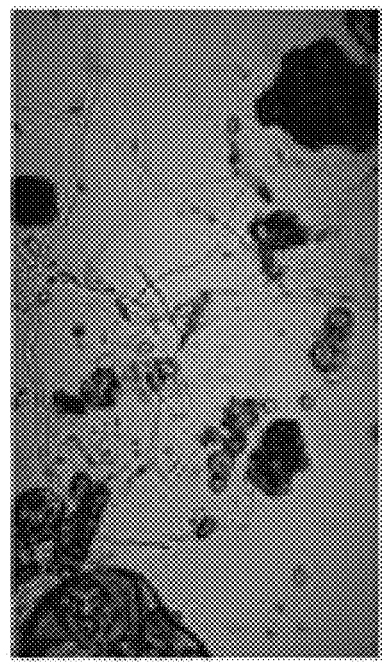
Figure 3:
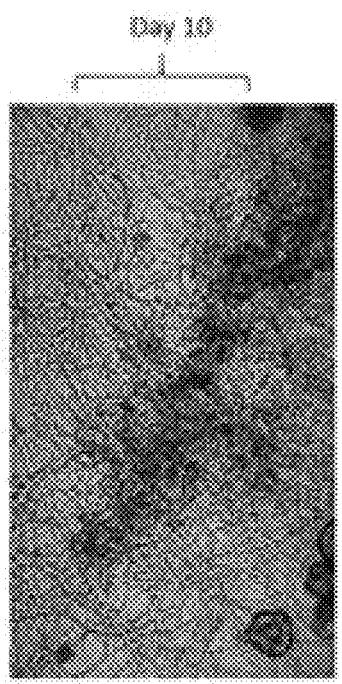
FIG. 3. A 10× photomicrograph of a mycelial culture at Day 10 grown in media containing rice and pea protein.
Figure 3:
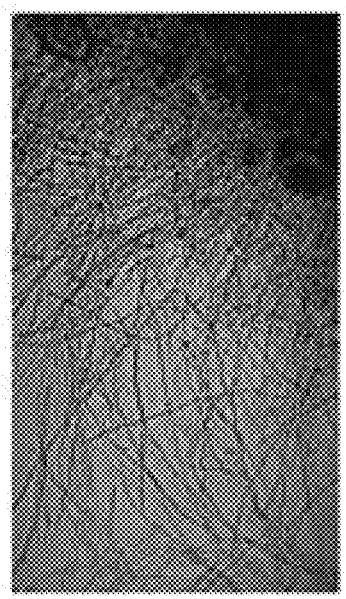

FIGS. 1-3 show an exemplification of the preparation of *L. edodes* as the fungal component for use for inoculating an aqueous media to prepare the myceliated high-protein food product. In this embodiment, a 1:1 mixture of pea protein and rice protein at 40% protein (8 g per 20 g total plus excipients) media was prepared, and FIGS. 1-3 show the results of conducting microscope checks over time (0, 4 and 10 days). The increase in biomass concentration was correlated with a drop in pH. After shaking for 1 to 10 days, an aliquot (e.g. 10 to 500 mL) of the shake flask may be transferred in using sterile procedure into a sterile, prepared sealed container (such as a customized stainless steel can or appropriate conical tube), which can then adjusted with about 5-60%, sterile, room temperature (v/v) glycerol. The glycerol stocks can may be sealed with a water tight seal and can be held stored at −20° C. for storage. The freezer is ideally a constant temperature freezer. Glycerol stocks stored at 4° C. may also be used. Agar cultures can be used as inoculant for the methods of the present invention, as can any culture propagation technique known in the art.

It was found that not all fungi are capable of growing in media as described herein. Fungi useful for the present invention are from the higher order Basidio- and Ascomycetes. In some embodiments, fungi effective for use in the present invention include, but are not limited to, *Pleurotus ostreatus, P. eryngii, Lepista nuda, Hericium erinaceus, Lentinula edodes, Agaricus blazeii, Ganoderma lucidum, Cordyceps sinensis, Inonotus obliquus, Grifola frondosa* and *Laetiporus sulfureus*. In one embodiment, the fungi is *Lentinula edodes*. Fungi may be obtained commercially, for example, from the Penn State Mushroom Culture Collection. Strains are typically received as "master culture" PDY slants in 50 mL test tubes and are stored at all, but for *A. blazeii*, stored at 4° C. until plated. For plating, small pieces of culture are typically transferred into sterile shake flasks (e.g. 250 mL) so as not to contaminate the flask filled with a sterilized media (liquid media recipes are discussed below). Inoculated flasks shake for approximately ten hours and aliquots of said flasks are then plated onto prepared Petri plates of a sterile agar media. One flask can be used to prepare dozens to potentially hundreds of Petri plate cultures. There are other methods of propagating master culture though the inventors find these methods as disclosed to be simple and efficient.

Determining when to end the culturing step and to harvest the myceliated high-protein food product, which according to the present invention, to result in a myceliated high-protein food product with acceptable taste, flavor and/or aroma profiles, can be determined in accordance with any one of a number of factors as defined herein, such as, for example, visual inspection of mycelia, microscope inspection of mycelia, pH changes, changes in dissolved oxygen content, changes in protein content, amount of biomass produced, and/or assessment of taste profile, flavor profile, or aroma profile. In one embodiment, harvest can be determined by tracking protein content during culturing and harvest before significant catabolism of protein occurs. The present inventors found that protein catabolism can initiate in bioreactors at 30-50 hours of culturing under conditions defined herein. In another embodiment, production of a certain amount of biomass may be the criteria used for harvest. For example, biomass may be measured by filtering, such through a filter of 10-1000 µm, and has a protein concentration between 0.1 and 25 g/L; or in one embodiment, about 0.2-0.4 g/L. In one embodiment, harvest can occur when the dissolved oxygen reaches about 10% to about 90% dissolved oxygen, or less than about 80% of the starting dissolved oxygen. Additionally, mycelial products may be measured as a proxy for mycelial growth, such as, total reducing sugars (usually a 40-95% reduction), β-glucan and/or chitin formation; harvest is indicated at $10^2$-$10^4$ ppm. Other indicators include small molecule metabolite production depending on the strain (e.g. eritadenine on the order of 0.1-20 ppm for *L. edodes* or erinacine on the order of 0.1-1,000 ppm for *H. erinaceus*) or nitrogen utilization (monitoring through the use of any nitrogenous salts or protein, cultures may be stopped just as protein starts to get utilized or may continue to culture to enhance the presence of mycelial metabolites). In one embodiment, the total protein yield in the myceliated high-protein food product after the culturing step is about 75% to about 95%.

Harvest includes obtaining the myceliated high-protein food product which is the result of the myceliation step. After harvest, cultures can be processed according to a variety of methods. In one embodiment, the myceliated high-protein food product is pasteurized or sterilized. In one embodiment, the myceliated high-protein food product is dried according to methods as known in the art. Additionally, concentrates and isolates of the material may be prepared using variety of solvents or other processing techniques known in the art. In one embodiment the material is pasteurized or sterilized, dried and powdered by methods known in the art. Drying can be done in a desiccator, vacuum dryer, conical dryer, spray dryer, fluid bed or any method known in the art. Preferably, methods are chosen that yield a dried myeliated high-protein product (e.g., a powder) with the greatest digestibility and bioavailability. The dried myeliated high-protein product can be optionally blended, pestled milled or pulverized, or other methods as known in the art.

In many cases, the flavor, taste and/or aroma of high-protein materials as disclosed herein, such as protein concentrates or isolates from vegetarian or nonvegetarian sources (e.g. egg, whey, casein, beef, soy, rice, hemp, and pea) may have flavors which are often perceived as unpleasant, having pungent aromas and bitter or astringent tastes. These undesirable flavors and tastes are associated with their source(s) and/or their processing, and these flavors or tastes can be difficult or impossible to mask or disguise with other flavoring agents. The present invention, as explained in more detail below, works to modulate these tastes and/or flavors.

In one embodiment of the invention, flavors and/or tastes of the myceliated high-protein food product or products are modulated as compared to the high-protein material (starting material). In some embodiments, both the sterilization and myceliation contribute to the modulation of the resultant myceliated high-protein food products' taste.

In one embodiment, the aromas of the resultant myceliated high-protein food products prepared according to the invention are reduced and/or improved as compared to the high-protein material (starting material). In other words, undesired aromas are reduced and/or desired aromas are increased. In another embodiment, flavors and/or tastes may be reduced and/or improved. For example, desirable flavors and/or tastes may be increased or added to the high-protein material by the processes of the invention, resulting in myceliated high-protein food products that have added mushroom, meaty, umami, popcorn, buttery, and/or other flavors or tastes to the food product. The increase in desirable flavors and/or tastes may be rated as an increase of 1 or more out of a scale of 5 (1 being no taste, 5 being a very strong taste.)

Flavors and/or tastes of myceliated high-protein food products may also be improved by processes of the current invention. For example, deflavoring can be achieved, resulting in a milder flavor and/or with the reduction of, for example, bitter and/or astringent tastes and/or beany and/or weedy and/or grassy tastes. The decrease in undesirable flavors and/or tastes as disclosed herein may be rated as an decrease of 1 or more out of a scale of 5 (1 being no taste, 5 being a very strong taste.)

Culturing times and/or conditions can be adjusted to achieve the desired aroma, flavor and/or taste outcomes. For example, cultures grown for approximately 2-3 days can yield a deflavored product whereas cultures grown for longer may develop various aromas that can change/intensify as the culture grows. As compared to the control and/or high-protein material, and/or the pasteurized, dried and powdered medium not subjected to sterilization or myceliation, the resulting myceliated high-protein food product in some embodiments is less bitter and has a more mild, less beany aroma.

In one embodiment of the present invention, the myceliated high-protein food products made by the methods of the invention have a complete amino acid profile (all amino acids in the required daily amount) because of the media from which it was made has such a profile. While amino acid and amino acid profile transformations are possible according to the methods of the present invention, many of the products made according to the methods of the present invention conserve the amino acid profile while at the same time, more often altering the molecular weight distribution of the proteome.

In one embodiment, when grown in a rice and pea protein concentrate medium the oyster fungi (*Pleurotus ostreatus*) can convey a strong savory aroma that leaves after a few seconds at which point a mushroom flavor is noticeable. In one embodiment, the strains convey a savory meaty aroma and/or umami, savory or meaty flavor and/or taste. *L. edodes* and *A. blazeii* in some embodiments are effective at deflavoring with shorter culturing times, such as 1.5-8 days, depending on whether the culture is in a shake flask or bioreactor. *L. edodes* to particularly good for the deflavoring of pea and rice protein concentrate mixtures.

In one embodiment of the instant invention, a gluten isolate or concentrate can be mixed into a solution with excipients as disclosed herein in aqueous solution. In one embodiment, the gluten content of the medium is ≥10% (10-100%) on a dry weight basis and sterilized by methods known in the art for inoculation by any method known in the art with any fungi disclosed herein, for example, with *L. sulfureus*. It has been found that *L. sulfureus* produces large amounts of guanosine monophosphate (GMP) (20-40 g/L) and gluten hydrolysate, and it is theorized that the process of culturing will result in lowering measurable gluten content, such as below 20 ppm gluten on a dry weight basis according to ELISA assay. Without being bound by theory, it is believed that the cultured material, by action of production of GMP and gluten hydrolysate, act synergistically to produce umami flavor. Without being bound by theory, it is believed that the combination of GMP and gluten hydrolysate amplifies the umami intensity in some kind of multiplicative as opposed to additive manner. The culture can be processed by any of methods disclosed in the invention and as are known in the art to produce a product of potent umami taste. Gluten may be obtained from any source known in the art, such as corn, wheat and the like, and may be used as a concentrate or isolate from a source.

The present invention also includes a myceliated food product made by any of the methods of as disclosed herein.

The present invention also comprises a myceliated high-protein food product as defined herein. The myceliated high-protein food product can comprise, consist of, or consist essentially of at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95%, protein.

"Myceliated" as used herein, means a high-protein material as defined herein having been cultured with live fungi as defined herein and achieved at least a 5%, at least a 10%, at least a 20%, at least a 30%, at least a 40%, at least a 50%, at least a 60%, at least a 70%, at least a 80%, at least a 90%, at least a 100%, at least a 120%, at least a 140%, at least a 160%, at least a 180%, at least a 200%, at least a 250%, at least a 300%, at least a 400%, at least a 500% increase in biomass or more, to result in a myceliated high-protein food product.

In some embodiments, the high-protein material is a protein concentrate or a protein isolate, which may be obtained from vegetarian or nonvegetarian source as defined herein, including pea, rice, soy, or combinations thereof. In some embodiments, the myceliated high-protein food product can be myceliated by a fungal culture as defined herein. In some embodiments, the myceliated high-protein food product can have enhanced meaty, savory, umami, popcorn, and/or mushroom flavors, aromas and/or tastes as compared to the high-protein material. In other embodiments, the myceliated high-protein food product has decreased flavors, tastes and/or aromas (deflavoring) leading to a milder and/or an improved flavor, taste or aroma. In one embodiment reduced bitterness, astringency and/or beany, grassy or weedy tastes are observed.

Example 1

Eighteen (18) 1 L baffled DeLong Erlenmeyer flasks were filled with 0.400 L of a medium consisting of 25 g/L organic pea protein concentrate (labeled as 80% protein), 25 g/L organic rice protein concentrate (labeled as 80% protein), 4 g/L organic dry malt extract, 2 g/L diammonium phosphate, 1 g/L organic carrot powder and 0.4 g/L magnesium sulfate heptahydrate in RO water. The flasks were covered with a stainless steel cap and sterilized in an autoclave on a liquid cycle that held the flasks at 120-121° C. for 1 hour. The flasks were carefully transferred to a clean HEPA laminar flowhood where they cooled for 18 hours. Sixteen (16) flasks were subsequently inoculated with 2 cm2 pieces of mature Petri plate cultures of *P. ostreatus, P. eryngii, L. nuda, H. erinaceus, L. edodes, A. blazeii, L. sulfureus* and *B. edulis*, each strain done in duplicate from the same plate. All 18 flasks were placed on a shaker table at 150 rpm with a swing radius of I" at room temperature. The Oyster (*P. ostreatus*), Blewit (*Lepista nuda*) and Lion's Mane (*H. erinaceus*) cultures were all deemed complete at 72 hours by way of visible and microscopic inspection (mycelial balls were clearly visible in the culture, and the isolation of these balls revealed dense hyphal networks under a light microscope). The other samples, but for the Porcini (*Boletus edulis*) which did not grow well, were harvested at 7 days. The Oysters had a specifically intense savory taste and back-end mushroom flavor. The Blewit was similar but not quite as savory. The Lion's Mane sample had a distinct 'popcorn' aroma. The 3, 7 day old samples were nearly considered tasteless but for the Chicken of the Woods (*Laetiporus sulphureus*) sample product which had a nice meaty aroma. The control sample smelled and tasted like a combination of pea and rice protein and was not considered desirable. The final protein content of every the resulting cultures was between 50-60% and the yields were between 80-90% after desiccation and pestling.

Example 2

Three (3) 4 L Erlenmeyer flasks were filled with 1.5 L of a medium consisting of 5 g/L pea protein concentrate (labeled as 80% protein), 5 g/L rice protein concentrate (labeled as 80% protein), 3 g/L malt extract and 1 g/L carrot powder. The flasks were wrapped with a sterilizable biowrap which was wrapped with autoclave tape 5-6 times (the taped biowrap should be easily taken off and put back on the flask without losing shape) and sterilized in an autoclave that held the flasks at 120-121° C. for 1 hour. The flasks were carefully transferred to a clean HEPA laminar flowhood where they cooled for 18 hours. Each flask was subsequently inoculated with 2 cm2 pieces of 60 day old P1 Petri plate cultures of *L. edodes* and placed on a shaker table at 120 rpm with a 1" swing radius at 26° C. After 7-15 days, the inventors noticed, by using a pH probe on 20 mL culture aliquots, that the pH of every culture had dropped nearly 2 points since inoculation. *L. edodes* is known to produce various organic acids on or close to the order of g/L and the expression of these acids are likely what dropped the pH in these cultures. A microscope check was done to ensure the presence of mycelium and the culture was plated on LB media to ascertain the extent of any bacterial contamination. While this culture could have been used as a food product with further processing (pasteurization and optionally drying), the inventors typically use such cultures as inoculant for bioreactor cultures of media prepared as disclosed according to the methods of the present invention.

Example 3

A 7 L bioreactor was filled with 4.5 L of a medium consisting of 5 g/L pea protein concentrate (labeled as 80% protein), 5 g/L rice protein concentrate (labeled as 80% protein), 3 g/L malt extract and 1 g/L carrot powder. Any open port on the bioreactor was wrapped with tinfoil and sterilized in an autoclave that held the bioreactor at 120-121° C. for 2 hours. The bioreactor was carefully transferred to a clean bench in a cleanroom, setup and cooled for 18 hours. The bioreactor was inoculated with 280 mL of inoculant from a 12 day old flask as prepared in Example 2. The bioreactor had an air supply of 3.37 L/min (0.75 VVM) and held at 26° C. A kick-in/kick-out antifoam system was setup and it was estimated that ~1.5 g/L antifoam was added during the process. At ~3-4 days the inventors noticed that the pH of the culture had dropped ~1.5 points since inoculation, similar to what was observed in the flask culture. A microscope check was done to ensure the presence of mycelium (mycelial pellets were visible by the naked eye) and the culture was plated on LB media to ascertain the extent of any bacterial contamination and none was observed. While this culture could have been used as a food product with further processing (pasteurization and optionally drying), the inventors typically use such cultures as inoculant for bioreactor cultures of media prepared as disclosed according to the methods of the present invention.

Example 4

A 250 L bioreactor was filled with 150 L of a medium consisting of 45 g/L pea protein concentrate (labeled as 80% protein), 45 g/L rice protein concentrate (labeled as 80% protein), 1 g/L carrot powder, 1.8 g/L diammonium phosphate, 0.7 g/L magnesium sulfate heptahydrate, 1 g/L antifoam and 1.5 g/L citric acid and sterilized in place by methods known in the art, being held at 120-121° C. for 100 minutes. The bioreactor was inoculated with 5 L of inoculant from two bioreactors as prepared in Example 3. The bioreactor had an air supply of 30 L/min (0.2 VVM) and held at 26° C. The culture was harvested in 4 days upon successful visible (mycelial pellets) and microscope checks. The pH of the culture did not change during processing but the DO dropped by 25%. The culture was plated on LB media to ascertain the extent of any bacterial contamination and none was observed. The culture was then pasteurized at 82° C. for 30 minutes with a ramp up time of 30 minutes and a cool down time of 45 minutes to 17° C. The culture was finally spray dried and tasted. The final product was noted to have a mild aroma with no perceptible taste at concentrations up to 10%. The product was ~75% protein on a dry weight basis.

Example 5

A 250 L bioreactor was filled with 200 L of a medium consisting of 45 g/L pea protein concentrate (labeled as 80% protein), 45 g/L rice protein concentrate (labeled as 80% protein), 1 g/L carrot powder, 1.8 g/L diammonium phosphate, 0.7 g/L magnesium sulfate heptahydrate, 1 g/L antifoam and 1.5 g/L citric acid and sterilized in place by methods known in the art, being held at 120-121° C. for 100 minutes. The bioreactor was inoculated with 5 L of inoculant from two bioreactors as prepared in Example 3. The bioreactor had an air supply of 30 L/min (0.2 VVM) and held at 26° C. The culture was harvested in 2 days upon successful visible (mycelial pellets) and microscope checks. The pH of the culture did not change during processing but the DO dropped by 25%. The culture was plated on LB media to ascertain the extent of any bacterial contamination and none was observed. The culture was then pasteurized at 82° C. for 30 minutes with a ramp up time of 30 minutes and a cool down time of 90 minutes to 10° C. The culture was finally concentrated to 20% solids, spray dried and tasted. The final product was noted to have a mild aroma with no perceptible taste at concentrations up to 10%. The product was ~75% protein on a dry weight basis.

Example 6

Eight (8) 1 L baffled DeLong Erlenmeyer flasks were filled with 0.4 L of media consisting of 45 g/L pea protein concentrate (labeled as 80% protein), 45 g/L rice protein concentrate (labeled as 80% protein), 1 g/L carrot powder, 1 g/L malt extract, 1.8 g/L diammonium phosphate and 0.7 g/L magnesium sulfate heptahydrate and sterilized in an autoclave being held at 120-121° C. for 1 hour. The flasks were then carefully placed into a laminar flowhood and cooled for 18 hours. Each flask was inoculated with 240 mL of culture as prepared Example 2 except the strains used were *G. lucidum, C. sinensis, I. obliquus* and *H. erinaceus*, with two flasks per species. The flasks were shaken at 26° C. at 120

RPM with a 1" swing radius for 8 days, at which point they were pasteurized as according to the parameters discussed in Example 5, desiccated, pestled and tasted. The *G. lucidum* product contained a typical 'reishi' aroma, which most of the tasters found pleasant. The other samples were deemed pleasant as well but had more typical mushroom aromas.

As compared to the control, the pasteurized, dried and powdered medium not subjected to sterilization or myceliation, the resulting myceliated food products was thought to be much less bitter and to have had a more mild, less beany aroma that was more cereal in character than beany by 5 tasters. The sterilized but not myceliated product was thought to have less bitterness than the nonsterilized control but still had a strong beany aroma. The preference was for the myceliated food product.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method to prepare a myceliated high-protein food product, comprising the steps of:
   providing an aqueous medium comprising a high-protein material, wherein the aqueous medium comprises at least 50% (w/w) protein on a dry weight basis, wherein the media comprises at least 50 g/L protein and wherein the high protein material is from a plant source comprising pea, rice or combinations thereof;
   inoculating the medium with a fungal culture, wherein the fungal culture consists of *Lentinula edodes* or *Agaricus blazeii*, and
   culturing the medium to produce a myceliated high-protein food product wherein the pH of the fungal culture does not change during processing;
   wherein the myceliated high-protein food product has reduced undesirable flavors and reduced aroma compared to the high-protein material that is not myceliated.

2. The method of claim 1, wherein the fungal culture is a submerged fungal culture.

3. The method of claim 1, wherein the aqueous medium comprises at least 60% (w/w) protein on a dry weight basis.

4. The method of claim 1, wherein the high-protein material is at least 70% (w/w) protein on a dry weight basis.

5. The method of claim 1, wherein the high-protein material is a protein concentrate or a protein isolate.

6. The method of claim 1, wherein the high protein material is sterilized or pasteurized prior to the inoculating step.

7. The method of claim 1, wherein the method further comprises the step of drying the myceliated high-protein food product.

8. The method of claim 1, wherein the medium further comprises dry carrot powder, dry malt extract, diammonium phosphate, magnesium sulfate, and citric acid.

9. The method of claim 1, wherein the culturing step is carried out until the dissolved oxygen in the medium reaches between 80% and 90% of the starting dissolved oxygen.

10. A myceliated food product made by the method of claim 1.

11. The method of claim 1, wherein the method further comprises the step of pasteurizing or sterilizing the myceliated high-protein food product.

12. A composition comprising a myceliated high-protein food product, wherein the myceliated high-protein food product is at least 50% (w/w) protein on a dry weight basis, wherein the myceliated high protein food product is derived from a pea or rice concentrate, wherein the myceliated high protein product is myceliated by a fungal culture consisting of *Agaricus blazeii* or *Lentinula edodes* in a media comprising at least 50 g/L protein, and wherein the myceliated high protein food product has reduced flavor and reduced aroma compared with a pea or rice concentrate wherein the myceliated high-protein food product is produced according to the method of claim 1.

13. The composition of claim 12, wherein the myceliated high-protein food product is at least 70% (w/w) protein on a dry weight basis.

14. The composition of claim 12, wherein the myceliated high-protein food product is in the form of a powder.

* * * * *